United States Patent [19]
Milunas et al.

[11] Patent Number: 5,537,982
[45] Date of Patent: Jul. 23, 1996

[54] FUEL INJECTION TIMING CONTROL

[75] Inventors: Rimas S. Milunas, Rochester Hills; Matthew A. Schroeder, Plymouth, both of Mich.

[73] Assignee: Saturn Corporation, Troy, Mich.

[21] Appl. No.: 422,238

[22] Filed: Apr. 14, 1995

[51] Int. Cl.$^6$ ............... F02D 41/08; F02D 41/10; F02D 41/12
[52] U.S. Cl. ............... 123/492; 123/478; 123/493
[58] Field of Search ............... 123/492, 493, 123/501, 502, 478

[56] References Cited

U.S. PATENT DOCUMENTS

| 3,633,559 | 1/1972 | Eheim | 123/502 |
|---|---|---|---|
| 4,596,221 | 6/1986 | Ament et al. | 123/501 |
| 4,957,086 | 9/1990 | Sasaki et al. | 123/492 X |
| 4,987,876 | 1/1991 | Minamitani et al. | 123/492 |
| 5,003,953 | 4/1991 | Weglarz et al. | 123/492 X |
| 5,054,451 | 10/1991 | Kushi | 123/478 |
| 5,222,481 | 6/1993 | Morikawa | 123/435 |
| 5,235,954 | 8/1993 | Sverdlin | 123/447 |
| 5,241,939 | 9/1993 | Nonaka | 123/492 |

*Primary Examiner*—Tony M. Argenbright
*Attorney, Agent, or Firm*—Michael J. Bridges

[57] ABSTRACT

Timing of delivery of a determined fuel injection quantity is adapted for engine operating conditions including current conditions and likely future conditions under which the fueling requirement may vary significantly from fueling event to fueling event. Parameters are sensed indicating the actual engine operating condition and indicating any current or potential transients, and a fuel injection timing value referenced as a function of the parameters to account not only for the current engine condition, but for likely future conditions.

12 Claims, 4 Drawing Sheets

FUEL INJECTION TIMING CONTROL

FIELD OF THE INVENTION

This invention relates to internal combustion engine control and, more particularly, to dynamic internal combustion engine fuel injection timing control.

BACKGROUND OF THE INVENTION

Internal combustion engine fuel injection timing refers to the time of delivery of a determined fuel quantity to an internal combustion engine, relative to the engine crank angle. Fuel injection timing may be expressed as an angular offset between an established crank angle, such as the crank angle at an intake valve opening or closing event, and the crank angle at which the fuel delivery begins or ends.

To maintain a desirable engine air/fuel ratio, the amount of fuel delivered is varied as a function of engine operating parameters. For example, the crank angle at which delivery of fuel ends may remain fixed while the crank angle at which delivery of fuel begins may vary as a function of the operating parameters. Such conventional control benefits from a variation in the amount of fuel delivered while holding the timing of delivery substantially constant. In general, conventional fuel delivery timing may be set to a fixed early timing, wherein fuel is injected into an engine intake passage well before a corresponding cylinder intake valve opens to admit the fuel to the cylinder. Such early injection timing increases fuel "residence time", which is the amount of time the fuel has to heat up and vaporize in the area of the hot cylinder intake valve prior to entering the cylinder for combustion. Vaporized fuel generally burns more completely in the cylinder than does liquid fuel. Therefore, up to a timing limit, increased residence time increases the potential for efficient and complete internal combustion engine combustion, increasing engine performance and reducing engine emissions.

Under transient conditions, such as conditions characterized by a rapidly changing engine load, static early injection timing may not be desirable. For example, under decrease transients, such as lift-off transient conditions characterized by a rapidly decreasing engine load, such as when an engine operator commands a rapid decrease in engine speed or output torque, conventional static early injection timing practices lag behind the rapidly reducing fueling needs of the engine, and may require several fueling cycles of delay before properly fueling the engine. Indeed, such conventional practices may not properly fuel the engine until the transient is substantially dissipated due to the early generation and issuance of a fueling command. Specifically, overfueling may occur leading to reduced engine performance.

Likewise, under increase transients, such as tip-in transient conditions characterized by a rapidly increasing engine load, such as when an engine operator commands a rapid increase in engine speed or output torque, early injection timing is preferred for flexibility in control of the amount of fuel delivered and for maximum residence time. For example, it may be desirable for engine response performance, to significantly increase the amount of fuel injected under throttle tip-in transient conditions. Early injection timing will allow for a maximum time for such an increase without overlapping subsequent engine control events, such as the intake valve closing event for the cylinder being fueled. Such valve closing event will effectively truncate the fuel injection event duration, resulting in tip-in underfueling and potential lean hesitation. Throttle tip-in transient conditions at engine idle are particularly sensitive to underfueling and further can require significant increases in the amount of fuel delivered. As such, all but extremely early injection timing values are unacceptable for engine idle tip-in transient conditions. The significant variation in fuel injection timing requirements under different transient conditions makes the conventional static fuel injection timing determination unacceptable. Accordingly, it would be desirable to provide for fuel injection timing control that dynamically adapts to the specific timing needs corresponding to various transient conditions.

SUMMARY OF THE INVENTION

The present invention provides a desirable dynamic fuel injection timing control approach that detects current and likely future transient conditions, diagnoses the nature or severity of the transient condition, and selects the fuel injection timing best suited to the specific needs of the current and of the likely future transient condition.

More specifically, engine operating parameters are analyzed and used to not only diagnose the current operating condition of the engine, but also of any likely transient condition that may occur in the near future. Fuel injection timing values are stored as a function of such parameters reflecting the fuel injection timing required to compensate for current conditions as indicated by the parameters and also to compensate for likely future transient conditions. Current fuel control needs will therefore be addressed without ignoring likely needs in the near future. The result is an overall fuel control that is competent to provide high performance and low emissions under current conditions without sacrificing performance or emissions when a sudden transient condition occurs requiring significant change in fuel control, such as a change in the amount of fuel delivered or the time of fuel delivery.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
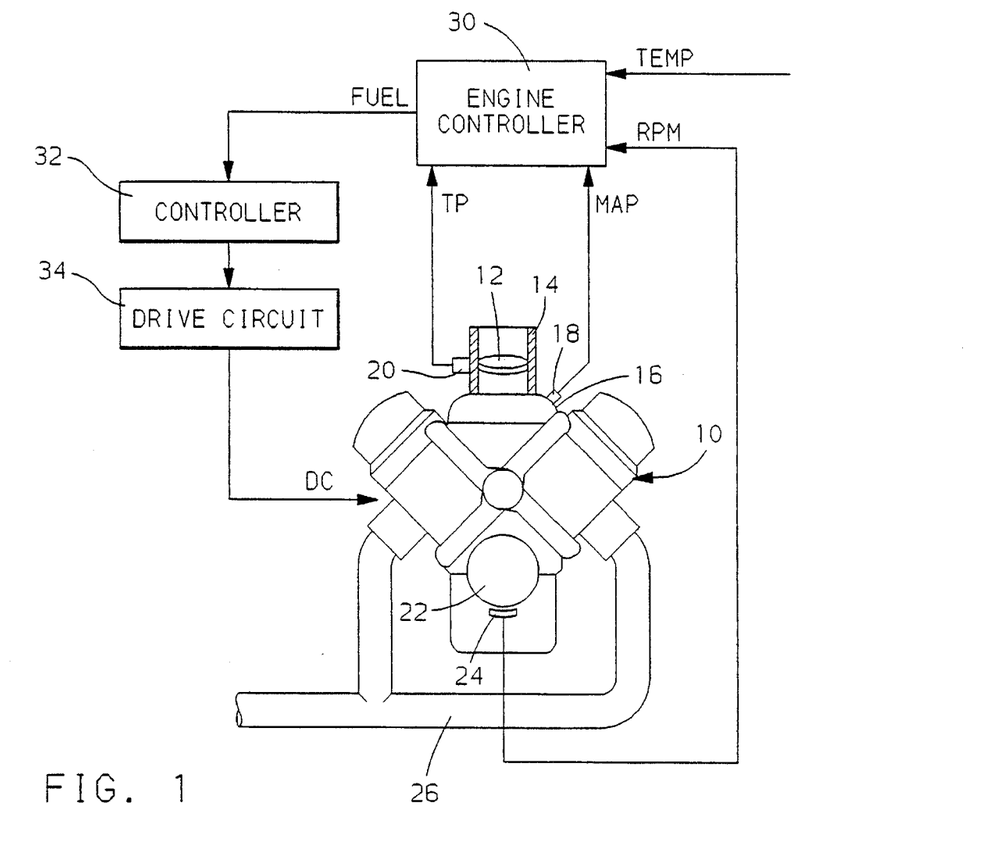
FIG. 1 is a schematic drawing of the engine and engine control hardware of the preferred embodiment.

Referring to FIG. 1, internal combustion engine 10 receives inlet air through manual positioning of an inlet air valve 12 such as a conventional butterfly or rotary valve positioned within throttle bore 14. The angular position of the valve 12 is transduced through conventional rotary potentiometric position sensor 20 which outputs signal Tp indicating the displacement of the valve 12 away from a rest position. Inlet air passes through bore 14 to engine intake manifold 16 for distribution to engine cylinders (not shown). Conventional pressure sensor 18 transduces the absolute air pressure in the intake manifold 16 and outputs signal MAP indicating such pressure. The inlet air is combined with a fuel charge in the engine cylinders and combusted for angular displacement of an engine output shaft 22 such as a conventional crankshaft. The rotational displacement of the output shaft 22 is sensed by conventional variable reluctance or Hall effect sensor 24, which outputs signal RPM characterized by a periodic analog signal, the frequency of which is directly proportional to the rate of rotation of the shaft 22. An input signal TEMP may also be provided in this embodiment indicating engine coolant temperature as provided, for example, by a conventional thermistor disposed in a coolant flow path. Beyond the described sensors 18, 20 and 24, other conventional sensors for sensing such engine parameters as pressure, temperature, speed, and other conventional engine parameters are provided for engine control operations in accord with general engine control practices. Such sensors output signals to engine controller 30 which may include such generally known controller elements as a central processing unit, a random access memory unit, a read only memory unit, and input/output units. The input/output units are generally directed by the central processing unit to read signals from the various engine sensors and to output control commands to various engine control actuators such as actuators controlling admission of fuel and air to the engine 10 and controlling the timing of engine ignition events. For example, engine controller periodically executes a fuel control algorithm comprising a series of fuel control operations executed in a step-by-step manner to generate a command FUEL indicating a timing and duration of a fuel pulse width applied to conventional fuel injectors (not shown). At the fuel injection timing determined in accord with this invention, the command FUEL is applied to a fuel controller 32 which translates the command into an appropriate form for application to a drive circuit 34 which may include a conventional current driver suitable for applying energization signals to each of the fuel injectors of the engine. The controller 32 will apply the command FUEL to an active engine fuel injector through the drive circuit 34, wherein an active fuel injector corresponds to an engine cylinder currently carrying out its exhaust or intake strokes. The drive circuit 34 issues a duty cycle command DC to the active fuel injector to open the fuel injector for a metering of pressurized fuel to the intake air passage of the active engine cylinder where the injected fuel will reside until the intake valve for the corresponding cylinder is opened allowing the fuel to be ingested into the cylinder for combustion therein. The combustion gasses produced through engine cylinder combustion operations are guided out of the engine via exhaust gas conduit 26.

Referring to FIGS. 2A–2E, relative timing of engine angular position events and fuel injection events in a conventional four cylinder engine in accord with the preferred embodiment are illustrated. Engine output shaft event signals 100 of FIG. 2A which, in this embodiment, occur every 60 angular degrees of rotation of output shaft 22 (FIG. 1), provide engine angular position information useful for event-based engine control operations as are generally understood in the art. For synchronization of the crank event signals 100, a camshaft event signal 102 is provided indicating the absolute angular position of the engine within an engine cycle. For example, at the negative going pulse 102A of signal 102, the engine is at a predetermined start position in an engine cycle and at position 102B of signal 102, is at the same angular position in a subsequent consecutive engine cycle. Synchronization information from signal 102 is provided to apply the relative angle position information of signals 100 to absolute engine cylinder event signals.

FIGS. 2B–2E generally illustrate the relationship between ignition events, engine angular position, and intake valve opening events, to indicate the fuel injection timing range that may yield improvements in engine performance and emissions in accord with this invention. For example, for a first engine cylinder described by the signals in FIG. 2B, the corresponding intake valve for the cylinder opens for a duration of time illustrated by the duration of pulse 106. Such intake valve event is followed by ignition event 108 at which the admitted air/fuel charge is combusted in the cylinder. At a next consecutive engine cycle intake event 110, again an air/fuel charge is admitted to the cylinder, and is then combusted at a following ignition event 104. Likewise, for a second engine cylinder, events of which are described by the signals in FIG. 2C, intake events 112, 116 and 120 are each followed by ignition events, such as events 114 and 118. For a third engine cylinder, events of which are illustrated by the signals in FIG. 2D, intake events 122 and 126 are followed by ignition events 124 and 128. Finally, in a fourth engine cylinder, events of which are illustrated by the FIG. 2E, intake events 130 and 138 are followed by ignition events 134 and 140, respectively. For this fourth cylinder, fuel injection event 132 illustrates an early injection timing having the benefit of allowing for a maximum residence time on the intake valve prior to the opening thereof, to provide for a maximum vaporization of the fuel for a more complete combustion of the air/fuel charge in the cylinder. The early injection time 132 also provides for the maximum flexibility for fuel charge magnitude variation during certain transient conditions that are determined to be likely to occur in the near future, or that are currently occurring, such as tip-in transient conditions in which a significant increase in the duration of the event 132 may be desired to minimize hesitation and lean operation during the tip-in and to improve engine performance stability under such transient conditions.

Figures 2A, 2B:
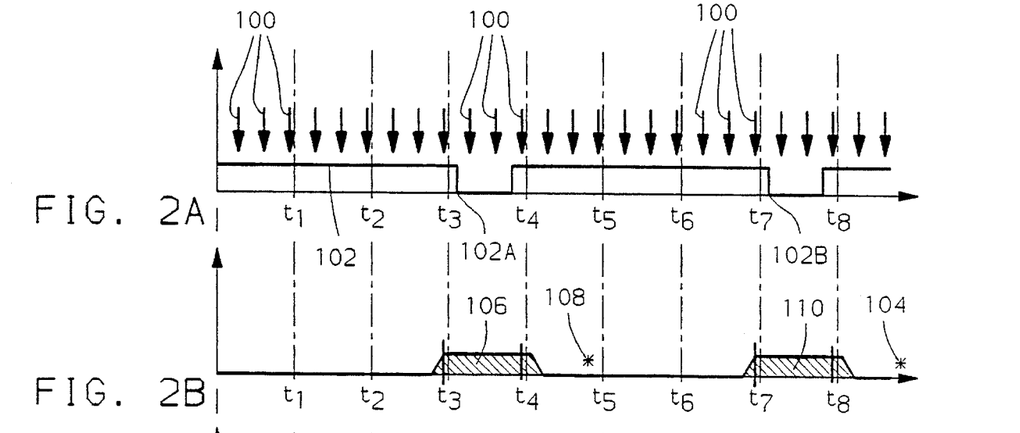
FIGS. 2A–2E are timing diagrams illustrating a timed relationship between engine control events in accord with this invention.
Figure 2C:
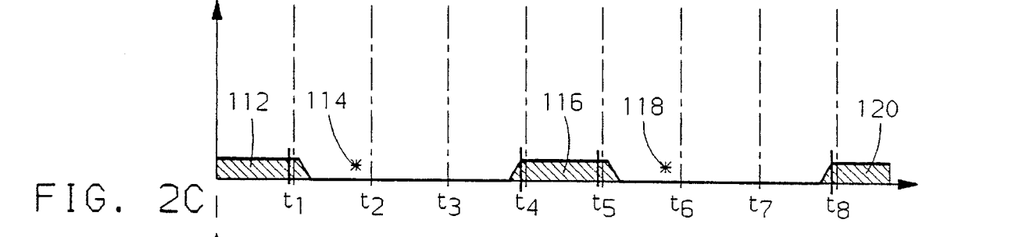
Figure 2D:
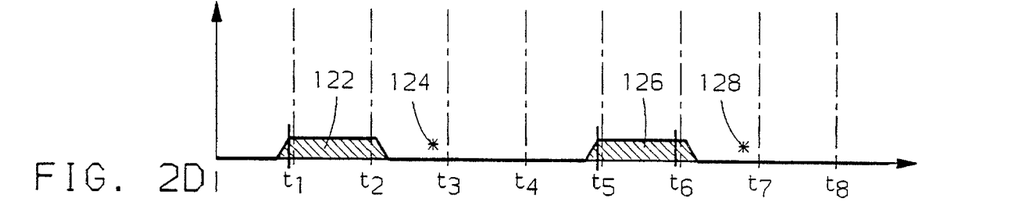
Figure 2E:
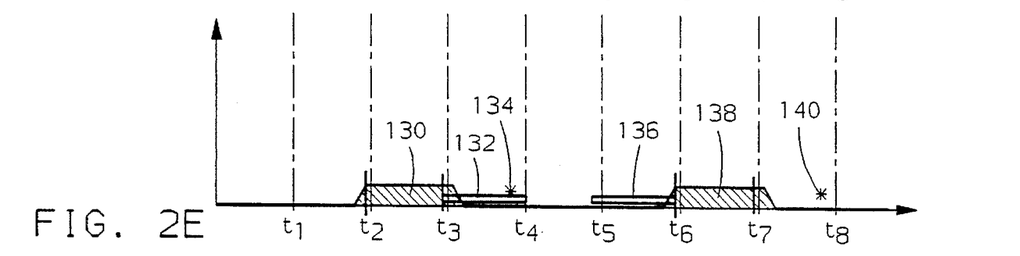

Fuel injection event 136 of FIG. 2E, for the fourth cylinder of the engine of this embodiment illustrates a late injection timing wherein a fuel delivery error may be minimized during certain transient conditions that are determined to be likely to occur in the near future or that are currently occurring, such as throttle lift-off transient conditions, in accord with this invention, by providing a maximum amount of time to reduce fuel delivery error when engine load is significantly decreasing. The delay in the injection timing illustrated by event 136 overlaps the corresponding intake valve opening event 138 thereby significantly reducing the residence time of the injected fuel quantity. Nonetheless, the late injection timing 136 provides a beneficial fuel timing control by minimizing fuel delivery error under certain transient conditions wherein such error has a much more significant impact on engine performance and emissions than does the slight reduction in combustion efficiency that corresponds to the reduced residence time of the injected fuel.

By varying strategically the timing of the fuel injection event between the extremes 132 and 136 for each of the engine cylinders of this embodiment, a beneficial engine performance and emissions control is provided under current or likely future transient conditions yielding a maximum control flexibility, low engine emissions, and improved engine performance under the transient conditions in accord with this invention.

Figure 3:
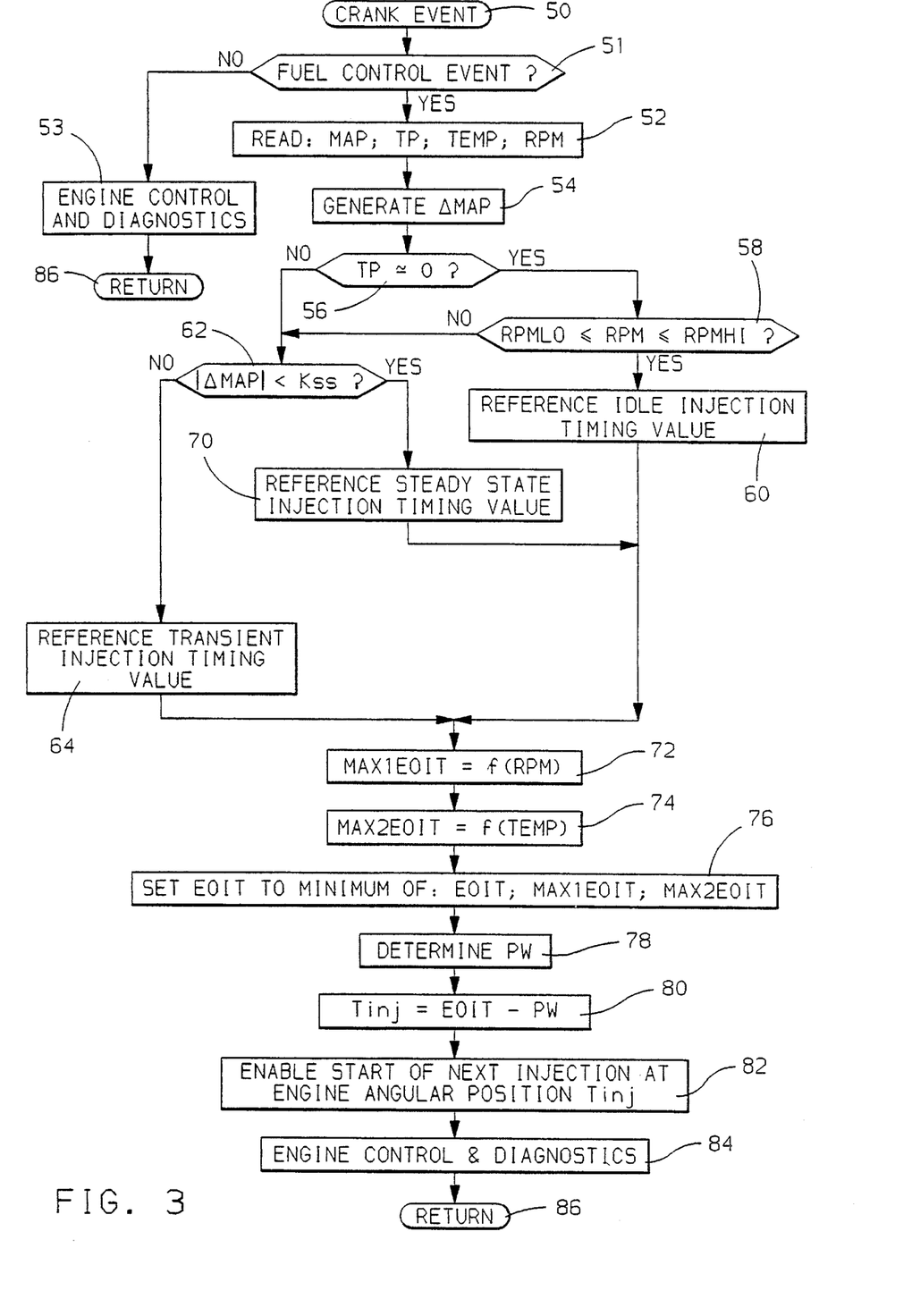
FIG. 3 is a computer flow diagram illustrating steps used to carry out the fuel injection timing control of the preferred embodiment.

To provide for such dynamic fuel injection timing control in accord with specific needs of each of the engine cylinders in accord with this embodiment, a series of fuel timing control operations are periodically executed during engine operation. Such operations are generally illustrated by the routine of FIG. 3, which is executed upon each occurrence of a crank event, such as upon each occurrence of the events 100 of FIG. 2A. A controller interrupt may be generated for each crank event, such as by applying a high voltage level to an input capture port of the controller 30 of FIG. 1. An interrupt service routine, stored in controller read only memory, may be executed upon occurrence of the interrupt by suspending any controller operations currently being executed, and vectoring to the service routine which may be executed in a step by step manner until complete. When the interrupt servicing is complete, such as at the end of the interrupt service routine, the suspended operations may be resumed and the interrupt reset to occur upon the next crank event.

The inventors intend that the series of fuel timing control operations, such as the operations illustrated in the routine of FIG. 3 may, in an alternative embodiment in accord with this invention, also be executed periodically as a function of time, such as by including such operations in a timer interrupt service routine which is executed to service a timer interrupt occurring at a predetermined time rate while the controller 30 of FIG. 1 is operating.

Returning to FIG. 3, the crank event interrupt service routine in accord with the present embodiment starts, upon occurrence of the crank event interrupt, at a step 50. The routine proceeds from step 50 to a next step 51 to determine if the current crank event is a fuel control event. In this embodiment in which crank events occur approximately every sixty degrees of crankshaft rotation, three crank events occur for each cylinder intake event, prior to which a fuel injection event must occur. Prior to the fuel injection event, a calculation of the fuel injection quantity and of the fuel injection timing must occur as are provided for through the operations of FIG. 3. Accordingly, at step 51 for every three crank events, or equivalently for every 180 degrees of crankshaft rotation, a fuel control event will occur and the steps of FIG. 3 for generating fuel injection quantity and a fuel injection timing are executed. However, if the current crank event is not a fuel control event as determined at the step 51, the routine proceeds to carry out any required engine control and diagnostic operations at a next step 53, such as operations executed every sixty or 120 degrees of crankshaft rotation, as are generally understood in the art. Such control and diagnostics may include ignition control operations, diagnostic operations for fuel injection and ignition systems and other generally understood control and diagnostic operations carried out in accord with conventional engine control and diagnostic practices. After executing such control and diagnostic operations at the step 53, the routine of FIG. 3 proceeds to a step 80 to return and to resume any prior operations that were ongoing and were temporarily suspended at the time of the crank event interrupt.

Figure 4:
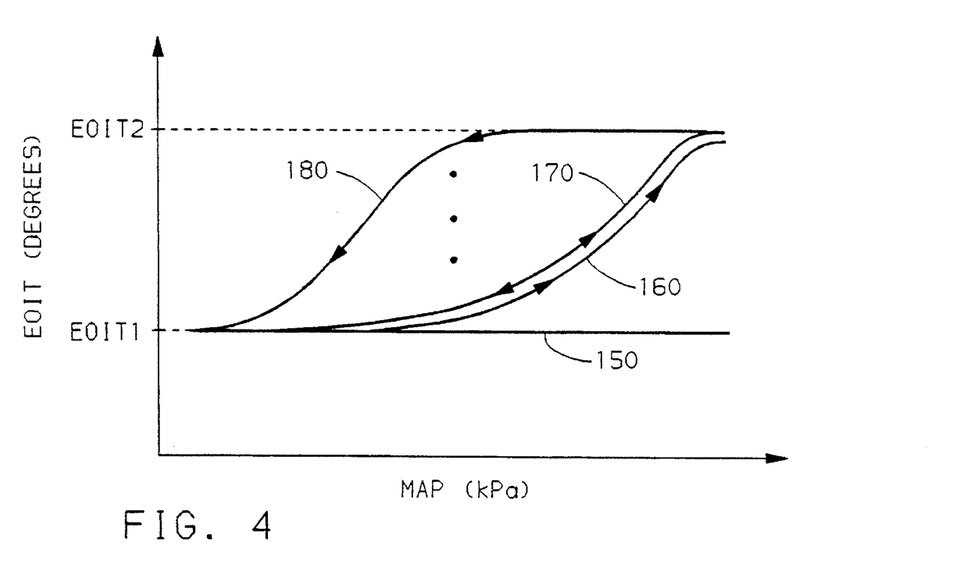
FIG. 4 is a graphical drawing illustrating a relationship between manifold absolute pressure and fuel injection timing under a variety of transient conditions in accord with the timing determination of the preferred embodiment.

Returning to the step 51, if the current crank event is a fuel control event, then the routine proceeds to a next step 52 to read input signals from engine sensors used in the operations of FIG. 3. In this embodiment, such signals include signal MAP indicating absolute air pressure in the intake manifold 16 of FIG. 1, signal TP indicating the angular displacement of the intake air valve 12 away from a rest position, signal TEMP indicating engine coolant temperature, and signal RPM indicating a rate of rotation of engine output shaft 22 of FIG. 1. After reading signals at the step 52, a value ΔMAP is generated at a next step 54 representing a time rate of change in air pressure in the intake manifold 16 of FIG. 1 over a predetermined period of time. The value ΔMAP may be generated by differentiating a predetermined series of read MAP signals, or by taking a difference between consecutive read MAP signals or by taking an average difference between a plurality of MAP signals. After generating ΔMAP at the step 54, the steps 56 and 58 are executed to determine if the current intake air valve position TP and the current engine speed RPM indicate that the engine is at an idle operating condition. For example, if TP is substantially zero at the step 56, and if RPM is within a predetermined engine speed range bounded by RPMLO on a low engine speed boundary and RPMHI on a high engine speed boundary at a next step 58, then the engine is assumed to be at an idle operating condition. In this embodiment, RPMLO is calibrated to about 600 r.p.m. and RPMHI is calibrated to about 1000 r.p.m. If at an idle operating condition, the routine proceeds to a step 60 to reference an idle injection timing value in accord with this invention. Curve 150 of FIG. 4 illustrates the calibrated fuel injection timing represented by an end of injection time in crankshaft angular degrees from a predetermined Crank event for the idle engine operating condition.

As illustrated by curve 150, the end of injection time is substantially insensitive to changes in manifold absolute pressure MAP at engine idle, due to the low likelihood of an overfueling condition and to the corresponding low potential for a late fuel injection requirement. The curve 150 corresponds to an early fuel injection timing as illustrated by the injection event 132 of FIG. 2 which slightly overlaps a prior engine cycle intake valve opening event for maximum residence time and maximum fuel injection control flexibility, for example to rapidly increase engine fueling without overlapping intake valve closing events in the likely event of a future tip-in transient condition. The idle injection timing value as illustrated by curve 150 of FIG. 4 may be referenced at the step 60 of FIG. 3 from engine controller read only memory as representing the result of a conventional calibration process during which the idle injection timing value is determined. After referencing the idle injection timing value at the step 60, the routine proceeds to a next step 72, to be described.

Returning to the steps 56 and 58, if the input signal TP is not substantially zero or the engine speed is not substantially within the predetermined engine speed range at the step 58, then the engine operating condition is assumed to not be an idle condition. Other operating parameters including vehicle speed, and current transmission gear may further be used instead of or in addition to the parameters of TP and RPM of the preferred embodiment, for determining whether an idle operating condition is present, as is generally understood in the art.

If an idle condition is not assumed to be present at the steps 56 and 58, the routine proceeds to a next step 62 to determine if the ΔMAP magnitude is substantially zero, indicating a steady state engine operating condition. A steady state operating condition is characterized by a substantially engine inlet air rate or cylinder inlet air rate, such as may be characterized through conventional analysis of such parameters and derivatives of such parameters as MAP, engine load, engine speed, or engine mass airflow rate. For example, if the manifold absolute pressure is substantially steady as indicated by a small (near zero) ΔMAP magnitude, a steady state operating condition is assumed to be present and a fuel injection timing value may be referenced from controller read only memory at a next step 70, for example as a predetermined function of MAP. A relationship between fuel injection timing at steady state conditions and such parameters as MAP is generally understood in the art and may be established through a conventional calibration process by determining a relationship for a specific engine between engine parameters such as MAP and fuel injection timing requirements under steady state conditions. The curve 170 of FIG. 4 illustrates a typical relationship for substantially zero ΔMAP values. The relationship of curve 170 may be stored in controller read only memory in the form of a function representing the relationship of curve 170 or in the form of a conventional lookup table. After referencing the steady state injection timing value corresponding to current operating parameter values at the step 70, a next step 72 is executed, to be described.

Returning to the step 62, if the steady state engine operating condition is not determined to be present, a transient fuel injection timing value is referenced at a next step 64 as a predetermined function of engine operating parameters, such as including MAP, and ΔMAP in this embodiment. The relationship between such values and engine operating parameters is generally illustrated by curves 160 and 180 of FIG. 4. For example, curve 160 represents the relationship between MAP and EOIT for increase transients characterized by increasing MAP values indicated by a significant positive ΔMAP value. A tip-in transient condition in which a rapid increase in throttle valve opening results in a rapid loss of intake manifold vacuum is the sort of transient condition for which the fuel injection timing of curve 160 may apply for maximum control flexibility to increase rapidly the quantity of fuel injected and for maximum fuel residence time to support more complete fuel combustion. For such control benefits, EOIT remains low, such as near EOIT1 even for relatively large MAP values, and yet increases significantly at high MAP to avoid fuel injection event truncation, as described.

For decrease transients characterized by decreasing MAP values which may be identified by significant negative ΔMAP values, curve 180 illustrates the relationship between MAP and EOIT. For example, a lift-off transient condition is a decrease transient that results in a rapid decrease in MAP as intake manifold vacuum builds following a rapid closing of an intake air valve 12 (FIG. 1). To ensure a high degree of fuel injection accuracy under such conditions, EOIT will remain high, such as near EOIT2 for a wide range of MAP values and will only decrease toward EOIT1 when MAP is extremely small. Whether the transient is an increase or a decrease, or whether in steady state conditions or at idle, the fuel injection timing values provided through the family of curves in FIG. 4 provide for an anticipation of likely transient conditions that may occur in the near future, as a function of current conditions. For example, all curves 150–180 provide for early injection timing at extremely low MAP values, as an increase transient such as a tip-in transient is likely to occur when the engine is operating with extremely low MAP values. By injecting fuel early in accord with this invention in anticipation of an increase transient, fuel control flexibility is improved, for example to allow for rapid increases in the fuel injection pulse duration without overlapping an intake valve closing event which, as described, could truncate the fueling event and result in underfueling and lean hesitation during tip-in. Likewise, all curves 160–180 provide for late injection timing at extremely high MAP values, as a decrease transient such as a lift-off transient is likely to occur when the engine is operating with extremely high MAP values. By injecting fuel late in accord with this invention in anticipation of a likely decrease transient, additional time may be made available for reduction of fueling in the event a decrease transient occurs, improving control flexibility to adjust rapidly for the transient and improving transient fuel control accuracy.

Rather than simply use a single curve 160 for increasing MAP values and another curve 180 for decreasing MAP values, additional curves may be provided and referenced as a function of a plurality of ΔMAP values in accord with this invention to provide for accurate fuel injection timing control as a function of MAP and of ΔMAP. Indeed, a three dimensional relationship between parameters indicating the current operating condition, such as the parameter of MAP in this embodiment, parameters indicating the nature and degree of any current transient condition, such as the parameter of ΔMAP in this embodiment, and EOIT may be stored in the form of a conventional lookup table and referenced through the operations of FIG. 3 to provide for the timing control in accord with the present invention. The simple curves 160 and 180 are provided as but one preferred example of how the nature and degree of current and potential future transient conditions may be used to more accurately and beneficially time fuel injection events in accord with this invention.

It should be pointed out that curves 160, 170 and 180 provide for fuel injection to end at about EOIT2, as the probability for a throttle lift-off condition is highest for high MAP values and therefore the probability that significant decrease in engine fueling requirement will occur is high for such high MAP values. Likewise, for low MAP values, curves 160, 170 and 180 maintain an early end of injection time, such as an end of injection time near EOIT1, to provide for maximum residence time of the injected fuel and in response to the high potential for a tip-in transient condition. The curves of FIG. 4 may be stored in controller 30 read only memory in the form of conventional look-up tables wherein look-up parameters of MAP and ΔMAP may be used to reference an end of injection time EOIT value from the table. For example, an idle fuel injection timing schedule may be stored as a conventional look up table by storing the end of injection time corresponding to a series of MAP values as illustrated by curve 150 in FIG. 4 and then by referencing and, perhaps, interpolating between various timing values to get the specific timing value corresponding to the current MAP value. Such an approach to referencing specific EOIT values may be sued for curves 160, 170 and 180 as well.

Figure 5:
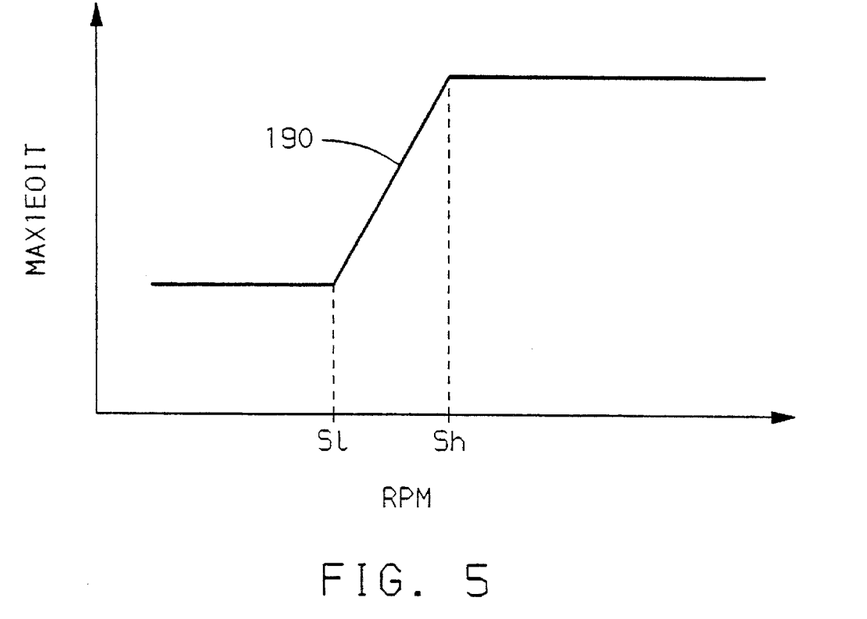
FIGS. 5 and 6 illustrate injection timing limits as a function of engine operating parameters as referenced in the operations of FIG. 3.

Returning to FIG. 3, after referencing the transient condition fuel injection timing value at the step 64, such as by referencing the EOIT value corresponding to the current MAP and ΔMAP values from read only memory, or after referencing timing values at the described steps 60 or 70, the steps 72–76 are executed to limit the end of injection time in accord with current engine operating conditions to avoid certain specific control difficulties that may occur in accord with this embodiment of this invention. For example, at a first step 72, a maximum injection time MAX1EOIT is referenced as a function of engine speed by applying the current engine speed to a lookup table including calibrated MAX1EOIT values paired with corresponding engine speed values. MAX1EOIT provides for earlier fuel injection at low engine speeds to avoid injecting fuel during intake air backflow conditions that occur at low engine speed intake valve openings. FIG. 5 illustrates the relationship between engine speed and MAX1EOIT for a typical engine calibration. Curve 190 of FIG. 5 illustrates a severe fuel injection timing limit at low engine speeds such as speeds below calibrated engine speed S1 at which severe cylinder charge backflow conditions can occur, reducing engine performance and increasing engine emissions. The fuel injection timing limit therefore provides for an earlier completion of the injection event to minimize the amount of fuel injected while backflow conditions are present. At engine speeds above S1 and approaching Sh, the backflow condition reduces significantly with engine speed, reducing the early rejection requirement. At engine speeds above the calibrated engine speed Sh, the backflow condition does not significantly interfere with fuel injection timing over a broad timing range so that even late fuel injection timing that may be desired in accord with this invention may be provided, such as during a throttle lift-off transient condition. The curve 190 of FIG. 5 may be stored as a conventional look-up table and limit values MAX1EOIT that correspond to current engine speed referenced therefrom.

After referencing the limit value at the step 72 of FIG. 3, a second limit value is referenced at the next step 74 as a predetermined function of engine coolant temperature TEMP to allow for a minimum reference time of the injected fuel in the area of the unopened intake valve when the engine is cold so as to provide additional time for fuel vaporization, to insure a more complete combustion of the air/fuel charge in the engine cylinders during cold engine operation.

Figure 6:
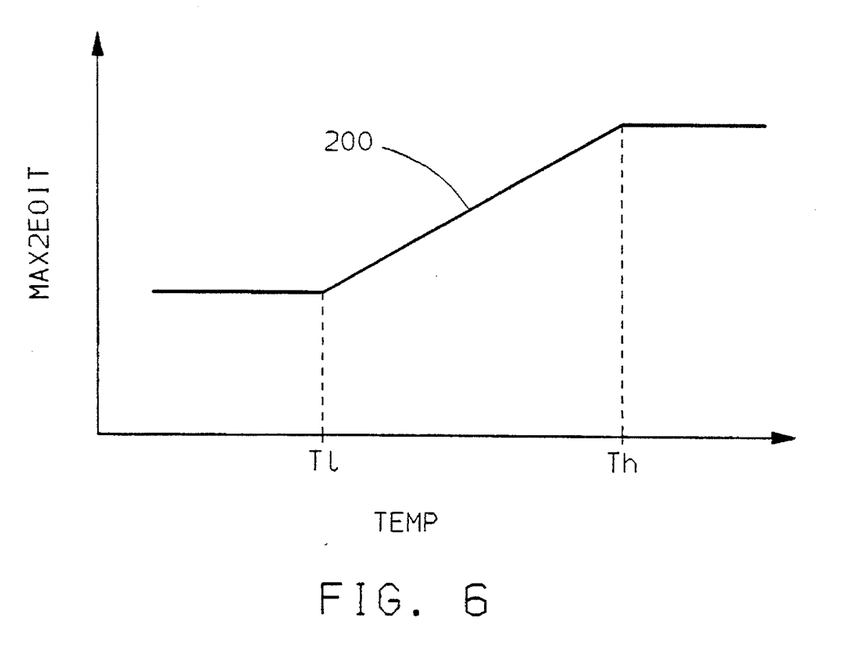

Curve 200 of FIG. 6 illustrates a typical calibration of the relationship between the coolant temperature TEMP and the limit value MAX2EOIT. For example, at coolant temperature values below calibrated temperature T1, a maximum residence time is required for acceptable fuel vaporization. Accordingly, MAX2EOIT is set to a relatively low value to ensure that early injection occurs. As engine coolant temperature increases above calibrated temperature T1 and approaches a second calibrated temperature Th, the residence time requirement is reduced, as the injected fuel vaporizes more rapidly on a hot intake valve. For engine coolant temperature exceeding calibrated temperature Th, the limit MAX2EOIT is effectively so high as to not significantly interfere with the fuel injection timing control of the present embodiment. The relationship of engine coolant temperature to the limit value MAX2EOIT as illustrated in calibration of curve 200 of FIG. 6, may be stored in the form of a conventional look up table in controller read only memory and limit values referenced therefrom as a function of the current TEMP value.

After referencing the limit value MAX2EOIT at the step 74 of FIG. 3, a next step 76 is executed to limit the determined end of injection time to the minimum of EOIT, MAX1EOIT, and MAX2EOIT, so that the end of injection time determined through execution of the steps 60, 64, or 70 will not exceed the smaller of the two limit values referenced at the steps 72 and 74. After limiting the end of injection time at the step 76, a conventional fuel pulse width calculation operation is executed at a next step 78 to determine an appropriate fuel pulse width under the current engine operating conditions to provide for a desirable engine air/fuel ratio, such as the stoichiometric ratio, to minimize engine emissions and to provide for acceptable engine performance in accord with generally understood fuel control practices. Such fuel pulse width may be calculated through application of a predetermined stored function or may be referenced from a conventional look up table as a predetermined function of engine operating parameters. Such fuel pulse width should be clearly distinguished from a fuel timing command. The pulse width is generally understood in the art to be the amount of time a fuel injector is to be opened for each fuel injection event, to deliver a pulse of pressurized fuel to an engine. Such pulse has a beginning time and an end time which are merely provided to define the duration of the pulse and thus the amount of fuel delivered. On the other hand, the present invention is directed to the time that any such fuel injection pulse is delivered relative to other engine events, such as crankshaft or camshaft events.

After determining the appropriate pulsewidth at the step 78, for example through application of control principles generally understood in the art, a start of injection time Tinj is determined as follows $$Tinj=EOIT-PW$$

in which PW is the pulsewidth determined at the described step 78. This equation clarifies the relationship between pulsewidth and the fuel injection timing of the present invention, in which the pulsewidth is applied to the absolute timing value EOIT so that the fuel injectors (not shown) will begin injecting at Tinj and complete injecting at time EOIT, and provide the desired amount of fuel to the engine.

After determining Tinj, a next step 82 provides for a start of fuel injection for the next active engine cylinder at the engine angular position corresponding to Tinj. For example, the value Tinj may be output at the step 82 to the fuel controller 32 of FIG. 1, so that a beginning of a drive pulse for an appropriate next fuel injector may be issued at an engine angle corresponding to time TINJ. The duration of the pulse will correspond to the determined pulse width PW from the described step 78, as is generally understood in the art. The signal output to the controller 32 may drop to a low voltage level at the time EOIT to terminate the injection event.

After enabling a start of injection at the step 82, conventional engine control and diagnostic routines are executed at a next step 84, such as including routines executed for each fuel injection event, including conventional fuel injection diagnostics routines or engine air and ignition timing routines. Upon completing such routines, and upon completing the routines executed at the described step 53, the routine of FIG. 3 proceeds to a step 86 to return to any ongoing operations that were temporarily suspended for the servicing of the present crankshaft event interrupt.

The preferred embodiment for the purpose of explaining this invention is not to be taken as limiting or restricting this invention since many modifications may be made through the exercise of ordinary skill in the art without departing from the scope of this invention.

The embodiments of the invention in which a property or privilege is claimed are described as follows:

1. A method for controlling timing of delivery of a determined fuel quantity to an internal combustion engine having an intake manifold, comprising the steps of:

storing a schedule of fuel injection timing values as a function of at least intake manifold pressure and rate of change of intake manifold pressure;

sensing intake manifold pressure and rate of change of intake manifold pressure;

referencing a fuel injection timing value from the stored schedule as a function of at least the sensed intake manifold pressure and rate of change of intake manifold pressure; and timing delivery of the determined fuel quantity in accord with the referenced fuel injection timing value.

2. A method for controlling the timing of delivery of a determined fuel quantity to an internal combustion engine, comprising the steps of:

storing a schedule of fuel injection timing values as a function of at least one predetermined engine operating parameter;.

sensing the at least one predetermined engine operating parameter;

referencing a fuel injection timing value from the stored schedule as a function of the sensed at least one predetermined engine operating parameter;

timing delivery of the determined fuel quantity in accord with the referenced fuel injection timing value;

sensing an engine idle operating condition;

referencing a predetermined maximum timing retard value upon sensing the engine idle operating condition; and timing delivery of the determined fuel quantity in accord with the predetermined maximum timing retard value upon sensing the engine idle operating condition.

3. A method for controlling a time of delivery of a determined amount of fuel to an automotive internal combustion engine, comprising the steps of:

sensing a value of an engine operating parameter;

determining that a predetermined decrease transient condition is likely to occur when the sensed value is within a predetermined first range of values;

referencing a predetermined late injection timing value when the predetermined decrease transient is determined to be likely to occur; and controlling the time of delivery in accord with the referenced late injection timing value when the predetermined decrease transient is determined to be likely to occur.

4. The method of claim 3, further comprising the steps of:

determining when the predetermined decrease transient is occurring;

referencing the predetermined late injection timing value when the predetermined decrease transient is occurring; and controlling the time of delivery in accord with the referenced late injection timing value when the predetermined decrease transient is occurring.

5. The method of claim 4, further comprising the step of:

determining a time rate of change in a predetermined engine parameter;

and wherein the step of determining when the predetermined decrease transient is occurring determines that the predetermined decrease transient is occurring when the determined time rate of change is less than zero.

6. The method of claim 4, further comprising the steps of:

determining when a predetermined increase transient is occurring;

referencing a predetermined early injection timing value when the predetermined increase transient is occurring; and controlling the time of delivery in accord with the referenced early injection timing value when the predetermined increase transient is occurring.

7. The method of claim 6, further comprising the step of:

determining a time rate of change in a predetermined engine parameter;

and wherein the step of determining when the predetermined increase transient is occurring determines that the predetermined increase transient is occurring when the determined time rate of change is greater than zero.

8. The method of claim 3, wherein the predetermined decrease transient is a transient engine operating condition in which engine inlet air rate is decreasing.

9. The method of claim 7, wherein the predetermined increase transient is a transient engine operating condition in which engine inlet air rate is increasing.

10. The method of claim 5, in which the engine comprises an intake manifold for receiving inlet air, wherein the engine operating parameter and the predetermined engine parameter are intake manifold pressure.

11. The method of claim 3, further comprising the steps of:

determining that a predetermined increase transient condition is likely to occur when the sensed value is within a predetermined second range of values;

referencing a predetermined early injection timing value when the predetermined increase transient is determined to be likely to occur; and controlling the time of delivery in accord with the referenced early injection timing value when the predetermined increase transient is determined to be likely to occur.

12. A method for controlling a time of delivery of a determined amount of fuel to an automotive internal combustion engine, comprising the steps of:

sensing a value of an engine operating parameter;

determining that a predetermined increase transient condition is likely to occur when the sensed value is within a predetermined range of values;

referencing a predetermined early injection timing value when the predetermined increase transient is determined to be likely to occur; and controlling the time of delivery in accord with the referenced early injection timing value when the predetermined increase transient is determined to be likely to occur.

* * * * *